United States Patent
Watanabe et al.

[11] Patent Number: 6,033,616
[45] Date of Patent: Mar. 7, 2000

[54] PROCESS FOR THE PRODUCTION OF MOLDED SYNTHETIC RESIN ARTICLE WITH FINISHED SURFACE

[75] Inventors: Hiromu Watanabe, Aichi; Masaharu Kitamura, Shiga, both of Japan

[73] Assignee: Maruwa Plastics Ind. Co., Ltd., Aichi, Japan

[21] Appl. No.: 09/144,997

[22] Filed: Sep. 1, 1998

Related U.S. Application Data

[63] Continuation-in-part of application No. 08/889,915, Jul. 10, 1997, abandoned, which is a continuation of application No. 08/505,909, Jul. 24, 1995, abandoned.

[30] Foreign Application Priority Data

Dec. 22, 1994 [JP] Japan .................................. 6-335424

[51] Int. Cl.$^7$ .................... B29C 43/18; B29C 44/06
[52] U.S. Cl. .............. 264/438; 264/46.4; 264/255; 264/259; 264/271.1; 427/466; 427/469
[58] Field of Search .................................. 427/458, 466, 427/469; 264/46.4, 255, 259, 271.1, 438

[56] References Cited

U.S. PATENT DOCUMENTS

| | | | |
|---|---|---|---|
| 3,061,888 | 11/1962 | Wadham | 264/438 |
| 3,673,296 | 6/1972 | Timko | 264/439 |
| 3,733,158 | 5/1973 | Ruekberg | 425/114 |
| 3,861,955 | 1/1975 | Lemelson | 427/131 |
| 4,032,671 | 6/1977 | Hyde | 427/14 |
| 4,294,880 | 10/1981 | Nishida | 264/46.6 |
| 4,350,739 | 9/1982 | Mohiuddin | 264/255 |
| 4,615,903 | 10/1986 | Miller | 427/26 |
| 4,919,862 | 4/1990 | Gilardi | 264/40.1 |
| 5,332,540 | 7/1994 | Duruz | 264/271.1 |
| 5,370,831 | 12/1994 | Blair et al. | 264/438 |
| 5,388,175 | 2/1995 | Clarke | 385/100 |

FOREIGN PATENT DOCUMENTS

| | | | |
|---|---|---|---|
| 7903428 | 11/1980 | Netherlands | 264/255 |
| 84/03251 | 8/1984 | WIPO | 264/255 |

Primary Examiner—Allan R. Kuhns
Attorney, Agent, or Firm—Evenson, McKeown, Edwards & Lenahan, PLLC

[57] ABSTRACT

A process of producing a molded synthetic resin article with a powder embedded in a surface thereof to form a finished surface. The process includes brushing an inner wall of a mold at a desired area thereof with a brush carrying a powder to be embedded in the surface of the article. The brushing action simultaneously provides an electrostatic charge on the inner wall of the mold for attracting and holding the powder thereon, and deposits the powder in an evenly distributed manner onto the desired area. A synthetic resin is fed into the mold. The synthetic resin is molded such that the synthetic resin is pressed against the desired area of the inner wall of the mold, flowing around the powder held thereon such that the powder is at least partially embedded in the synthetic resin. The process provides a uniform non-strippable firm surface of the powder on a surface of the resulting article.

19 Claims, 1 Drawing Sheet

PROCESS FOR THE PRODUCTION OF MOLDED SYNTHETIC RESIN ARTICLE WITH FINISHED SURFACE

CROSS-REFERENCE TO RELATED APPLICATIONS

This is a continuation-in-part of application Ser. No. 08/889,915, filed Jul. 10, 1997, now abandoned which is a continuation of Ser. No. 08/505,909, filed Jul. 24, 1995, now abandoned, which claims the priority of Japanese patent HEI 6-335424, filed Dec. 22, 1994.

BACKGROUND OF THE INVENTION a) Field of the Invention

This invention relates to a process for the production of a molded article with a finished surface, which includes feeding a synthetic resin in a mold such as that employed, for example, for the production of domestic ceiling light fixtures and then hardening the synthetic resin within the mold. This invention is also concerned with a molded synthetic resin article which has been produced by the above process and is provided with a finished surface.

b) Description of the Related Art

As a process for the easy and low-cost production of lightweight articles such as frames of domestic ceiling light fixtures, it has heretofore been the practice to feed a synthetic resin such as an expandable polyurethane resin into a mold made of silicone rubber or the like and hardening the synthetic resin to form an article of the desired shape, followed by taking the thus-formed article out of the mold. Surface coating of the article so molded from the synthetic resin is then conducted in an additional coating step.

Whichever coating method is employed, the above described conventional process however requires to take the thus-molded synthetic resin article out of the mold after the hardening of the fed synthetic resin into the desired shape within the mold, and further to coat the molded synthetic resin article. The conventional process therefore requires the coating step in addition to the molding step of the synthetic resin within the mold. The conventional process is also accompanied by the drawbacks that the resulting coating is uneven, a coating material is wasted, and the coated surface has low adhesion to the base material and hence tends to separate.

SUMMARY OF THE INVENTION

An object of the present invention is therefore to improve the above-described drawbacks of the conventional process. Described more specifically, an object of the present invention is to provide a simple and economical process for forming a firm non-strippable surface on a molded synthetic resin article by using a fine powder in an amount as little as needed without occurrence of uneven coating while omitting the independent coating step for the molded synthetic resin article. Another object of the present invention is to provide a molded synthetic resin article with such a firm non-strippable surface formed thereon in accordance with the above process.

In one aspect of the present invention, there is thus provided a process for the production of a molded synthetic resin article with a finished surface, which comprises electrostatically charging an inner wall of a mold at a desired area thereof, causing even attraction of a fine powder onto the charged area, feeding a synthetic resin into the mold, and then molding the synthetic resin under pressure within the mold so that the synthetic resin is pressed against the desired area of the inner wall of the mold to form an even non strippable firm surface of the powder on a surface of the thus-molded article. The synthetic resin can preferably be an expandable synthetic resin such as expandable polyurethane. In this preferred case, the molding is conducted under heat. As the synthetic resin, a molten synthetic resin can also be fed under pressure into the mold. In this preferred case, the molding is conducted by melt molding.

In another aspect of the present invention, there is also provided a molded synthetic resin article with an even non-strippable firm surface of a fine powder formed on a surface of the article in accordance with the above process.

The present invention advantageously simplifies the process for producing a molded article, reducing manufacturing times and manufacturing costs.

According to one particularly preferred aspect, the present invention provides a process of forming a molded synthetic resin article with a powder embedded in a surface of the article, said process comprising the steps of: brushing an inner wall of a mold at a desired area thereof with a brush carrying the powder to simultaneously electrostatically charge the desired area and distribute said powder onto said desired area; feeding a synthetic resin into the mold such that said powder is embedded in said synthetic resin.

According to another particularly preferred aspect, the present invention provides a process of forming a molded synthetic resin article with a powder embedded in a surface of the article, said process comprising the steps of: brushing an inner wall of a mold at a desired area thereof with a brush carrying the powder such that said desired area is electrostatically charged; said powder is deposited from said brush onto said desired area, and said powder is distributed in said desired area by said brush; feeding a synthetic resin into the mold such that said powder is embedded in said synthetic resin.

According to these particularly preferred aspects, the process of the present invention has not only made it possible to omit the independent additional coating step, but has also made it possible to simultaneously electrostatically charge the mold and apply the fine powder thereto, simply by brushing the wall of the mold with a brush carrying the fine powder. Consequently, significant time savings are achieved by this one-step electrostatic charging and deposition/distribution of the fine powder.

Moreover, a surface of the fine powder evenly formed on the inner wall of the mold is transferred and partially embedded in a surface of the molded synthetic resin as the synthetic resin hardens within the mold. Therefore the surface of the fine powder is even and is not strippable. The surface of the fine powder can be evenly applied even to narrow corners, thereby making it possible to apply a coating having an improved artistic appearance. Since the deposition of the fine powder on the inner wall of the mold is conducted by static electricity, non-deposited powder can be readily recovered in a practically unused form so that the consumption of the fine powder can be reduced. The area to be electrostatically charged can be changed freely as desired, thereby making it possible to easily change the coated area.

Other objects, advantages and novel features of the present invention will become apparent from the following detailed description of the invention when considered in conjunction with the accompanying drawings.

DETAILED DESCRIPTION OF THE INVENTION AND PREFERRED EMBODIMENT

Figure 1:
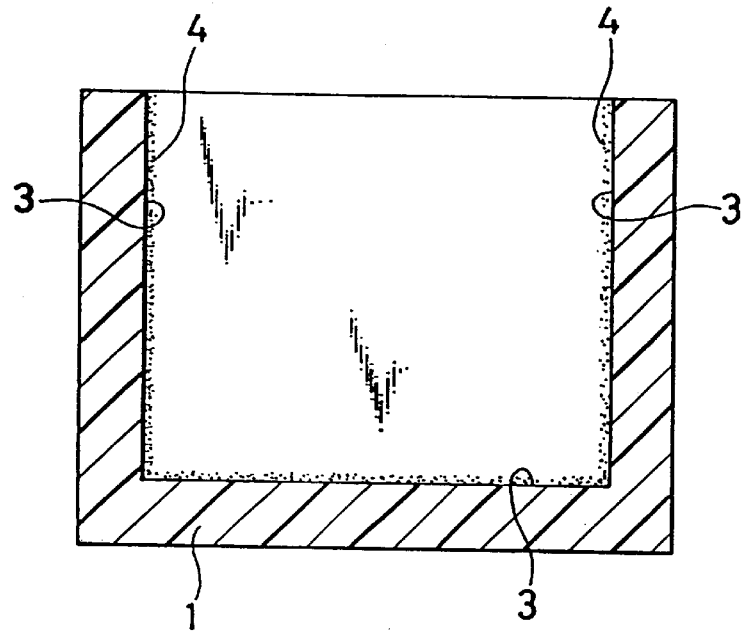
FIG. 1 is a vertical cross-section of a mold for a synthetic resin after deposition of a fine powder on an inner wall of the mold but before feeding of the synthetic resin into the mold, as employed in an Example of the present invention.
Figure 2:
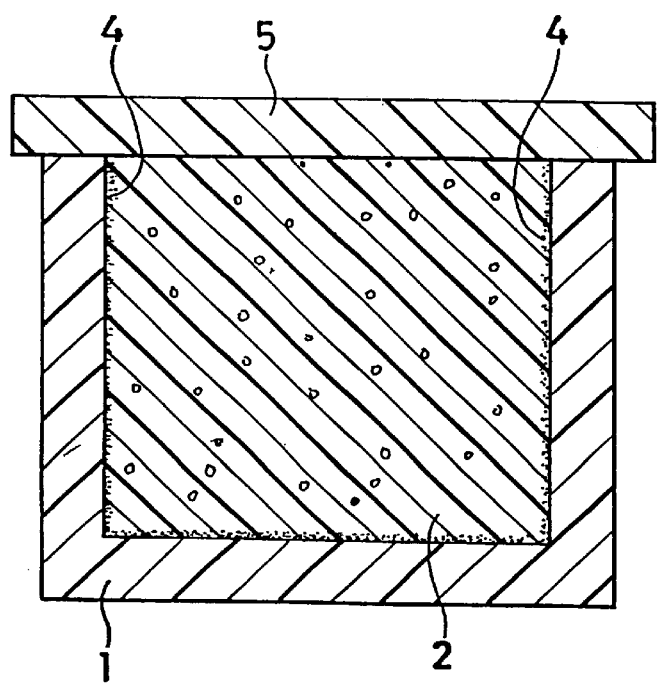
FIG. 2 is a vertical cross-section of the mold with the synthetic resin molded therein.

With reference to the accompanying drawings, the present invention will hereinafter be described by the following Example.

Designated at numeral 1 is a mold made of an electrically insulating material, desirably silicone rubber. A synthetic resin such as an expandable polyurethane is fed into the mold 1 and is then caused to expand under pressure, so that the synthetic resin is molded into a shape conforming with the shape of the mold. Instead of such an expandable synthetic resin, a synthetic resin such as polystyrene, a methacrylate resin, polyethylene, polypropylene or ABS can be charged under pressure. These resins can be molded by so-called melt molding. Numeral 3 indicates electrostatically-charged surfaces, which are areas electrostatically charged by an electrostatic charger out of inner walls of the mold 1. Numeral 4 designates aluminum powder as a fine powder. It is to be noted that the fine powder is not limited to such a metal powder but any fine powder is usable insofar as it can be attracted electrostatically. The aluminum powder 4 is electrostatically fixed on each electrostatically charged surface 3 inside the mold 1. Designated at numeral 5 is a cover, which closes up the mold 1 to form a closed space in which the fed expandable polyurethane is caused to expand under heat. In the case of a non-expandable synthetic resin, the resin is fed under pressure in a molten form, that is, the resin is molded, for example, by melt molding such as injection molding or blow molding.

A description will hereinafter be made of a process according to certain preferred embodiments of the present invention for the production of a molded synthetic resin article with a finished surface. Static electricity is charged on a desired area of at least one of the inner walls of the mold 1 by an electrostatic charger, for example by brushing. If it is desired to apply a coating, for example, to the entirety of a surface of the molded article 2, said surface being in contact with the mold 1, it is only necessary to electrostatically charge the entire inner walls of the mold 1 to provide the electrostatically-charged surfaces 3. To charge static electricity on a desired area of at least one of the inner walls of the mold 1, it is only necessary, as a simplest method, to rub the desired area with a brush or the like. According to certain preferred embodiments, the brush may be made of animal hair or horse hair. Even after static electricity has been charged to form each electrostatically-charged surface 3, grounding of the electrostatically-charged surface 3, can easily discharge the static electricity.

The aluminum powder 4 is applied onto each electrostatically-charged surface 3 inside the mold 1, for example, via a brush carrying the powder. Any aluminum powder 4 which has not been attracted, in other words, has not deposited on each electrostatically-charged surface 3 is then removed from the interior of the mold 1, for example, by brushing it out of the mold 1. The extra aluminum powder can therefore be recovered in a substantially unused form.

According to the preferred embodiments, a brush with aluminum powder carried thereon is used to electrostatically charge the inner wall of the mold at the desired area, which makes it possible to electrostatically deposit the aluminum powder at the same time on the desired area. Accordingly, the use of the brush with aluminum powder carried thereon can achieve the electrostatic charging of the inner wall and the electrostatic deposition of the aluminum powder in a single step. Further, use of a brush for electrostatic charging of the inner wall of the mold, no matter whether the brush carries aluminum powder or not, makes it possible to electrostatically attract the aluminum powder on the inner wall of the mold in such a way that individual particles of the aluminum powder are deposited with spaces left therebetween.

No particular limitation is imposed on the type of the hairs or bristles of the brush insofar as they simultaneously permit electrostatic charging of the inner wall of a mold at a desired area and distribution of a powder from the brush onto the desired area. Animal hairs or bristles are however more preferable than synthetic resin filaments or fibers, because electrostatic charging tends to become less even when a brush formed of synthetic resin filaments or fibers is used. The brush is used to effect electrostatic charging and distribution and deposition of a powder at the same time, and therefore is required to have a certain degree of stiffness. According to the results of an experiment conducted by the inventors, horse barrel bristles, i.e., bristles from the barrel or trunk of a horse, have been found to be most suitable.

After the mold has been electrostatically charged and the powder distributed thereon, the expandable polyurethane is fed into the mold 1 and is then caused to expand under heat. The molding temperature generally ranges from 70° C. to 90° C., although it varies depending on the blowing agent incorporated in the expandable polyurethane. The internal pressure produced by the expansion reaches about 10 kg/cm$^2$ or so. Because of the feeding of the expandable polyurethane in the mold 1, the expandable polyurethane is obviously brought into contact with the electrostatically-charged surfaces 3, that is, the inner walls of the mold 1, said inner walls carrying the aluminum powder 4 deposited thereon. As the expandable polyurethane expands, the polyurethane is allowed to penetrate toward the inner wall of the mold through the spaces between the individual particles of the aluminum powder electrostatically deposited on the inner wall of the mold. The aluminum powder 4 is transferred from the electrostatically charged surfaces 3, onto the surfaces of the resulting foamed polyurethane article. As the foamed polyurethane article is allowed to harden, the aluminum powder 4 is fixed as if it is at least partially embedded in the surfaces of the foamed polyurethane article 2. After the foamed polyurethane article 2 has hardened, the foamed polyurethane article 2 is taken out of the mold 1.

As the deposition of the aluminum powder 4 on the electrostatically charged surfaces 3 takes place under the action of the static electricity, the aluminum powder 4 is evenly deposited on the electrostatically charged surfaces 3 when the aluminum powder 4 is simply applied, for example, by brushing. Since the state of deposition of the aluminum powder 4 is even, the aluminum powder 4 also retains evenness on the surface of the foamed polyurethane article 2 after its transfer from the electrostatically-charged surfaces 3 onto the surfaces of the foamed polyurethane article 2. owing to the development of the pressure as a result of the expansion, the surface of the fine powder is formed as a non-strippable surface firmer than conventional coatings.

It is also possible to readily limit the coated area of the foamed polyurethane article 2 by limiting the area of each electrostatically-charged surface 3 as desired. This can be effected by one of two methods, one being to limit, from the beginning, the area to be electrostatically charged into the electrostatically charged surface 3, and the other being once to electrostatically charge the entire area of at least one of the internal walls of the mold 1 into the electrostatically-charged surface 3 and then to ground a desired portion so that the static electricity is removed only at the grounded portion. These methods can be practiced easily and can be selectively used in accordance with the area of the non-charged portion and the efficiency of the work.

In a modification of the above-described embodiment of the present invention, a partial mold which is used to mold a portion of the molded article can be provided in addition to the mold 1 for the whole molded article. This partial mold is assembled in the mold 1, followed by feeding of expandable polyurethane to obtain a single-piece foamed polyurethane article. If plural partial molds of different types are furnished and are changed from one to another, it is possible to easily mold a plurality of modified products with respect to the particular foamed polyurethane article. Use of this modified process makes it possible to easily mold a variety of modified products with respect to a single foamed polyurethane article.

Because of the use of the aluminum powder 4 as a fine powder in the above embodiment, the resulting foamed polyurethane article presents a metallic external appearance. Needless to say, the fine powder is not limited to the aluminum powder 4 but, insofar as a fine powder is employed, no particular limitation is imposed on the kind of the fine powder since any fine powder can generally be attracted by static electricity on the inner walls of the mold 1. Further, a nonexpandable synthetic resin can also be fed in a molten form under pressure instead of such a expandable synthetic resin. Here again, a molded article having an even, firm, non-strippable surface can also be obtained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process of forming a molded synthetic resin article with a powder embedded in a surface of the article, said process comprising the steps of:

brushing an inner wall of a mold at a desired area thereof with a brush carrying the powder to simultaneously electrostatically charge the desired area and distribute said powder onto said desired area;

feeding a synthetic resin into the mold such that said powder is embedded in said synthetic resin.

2. A process according to claim 1, wherein in said brushing step, said powder is distributed such that individual particles of said powder are spaced from each other.

3. A process according to claim 2, wherein in said feeding step, said synthetic resin flows into the spaces between said individual particles.

4. A process according to claim 1, wherein in said feeding step, said synthetic resin is molded under pressure such that said synthetic resin is pressed against said inner wall of said mold.

5. A process according to claim 1, wherein said brush is made of animal hairs or animal bristles.

6. A process according to claim 5, wherein said brush is made of horse barrel bristles.

7. A process according to claim 1, wherein the synthetic resin is an expandable synthetic resin and the molding is conducted under heat.

8. A process according to claim 7, wherein the expandable synthetic resin is expandable polyurethane.

9. A process according to claim 1, wherein as the synthetic resin, a molten synthetic resin is fed under pressure into the mold, and the molding is conducted by melt molding.

10. A process according to claim 9, wherein said synthetic resin is selected from the group consisting of molten polystyrene, methacrylate resins, polyethylene, polypropylene and ABS.

11. A process according to claim 1, wherein the fine powder is aluminum powder.

12. A process according to claim 1, wherein the mold is made of silicone rubber.

13. A process according to claim 1, further comprising grounding a desired part of the electrostatically charged area to modify the shape of the electrostatically charged area.

14. A process of forming a molded synthetic resin article with a powder embedded in a surface of the article, said process comprising the steps of:

brushing an inner wall of a mold at a desired area thereof with a brush carrying the powder such that said desired area is electrostatically charged;

said powder is deposited from said brush onto said desired area, and said powder is distributed in said desired area by said brush;

feeding a synthetic resin into the mold such that said powder is embedded in said synthetic resin.

15. A process according to claim 14, wherein in said brushing step, said powder is distributed such that individual particles of said powder are spaced from each other.

16. A process according to claim 15, wherein in said feeding step, said synthetic resin flows into the spaces between said individual particles.

17. A process according to claim 14, wherein in said feeding step, said synthetic resin is molded under pressure such that said synthetic resin is pressed against said inner wall of said mold.

18. A process according to claim 14, wherein said brush is made of animal hairs or animal bristles.

19. A process according to claim 18, wherein said brush is made of horse barrel bristles.

* * * * *